3,017,210
NON-ROTATING SPRAG COUPLING
James W. Palm, Rockford, Ill., assignor to Borg-Warner
Corporation, Chicago, Ill., a corporation of Illinois
Filed Apr. 7, 1958, Ser. No. 726,984
9 Claims. (Cl. 287—114)

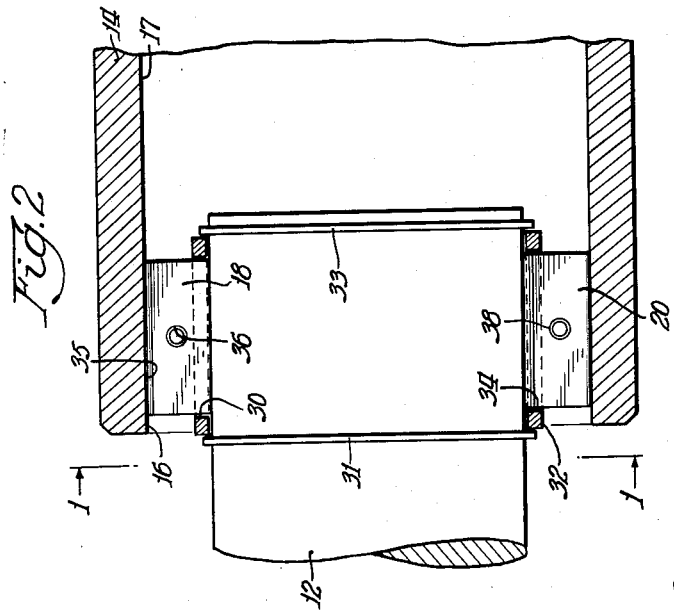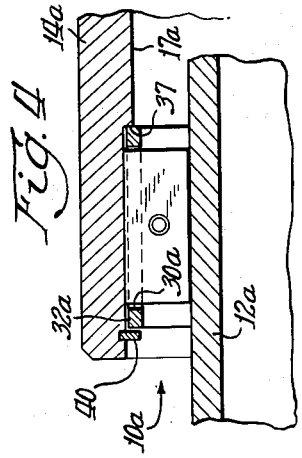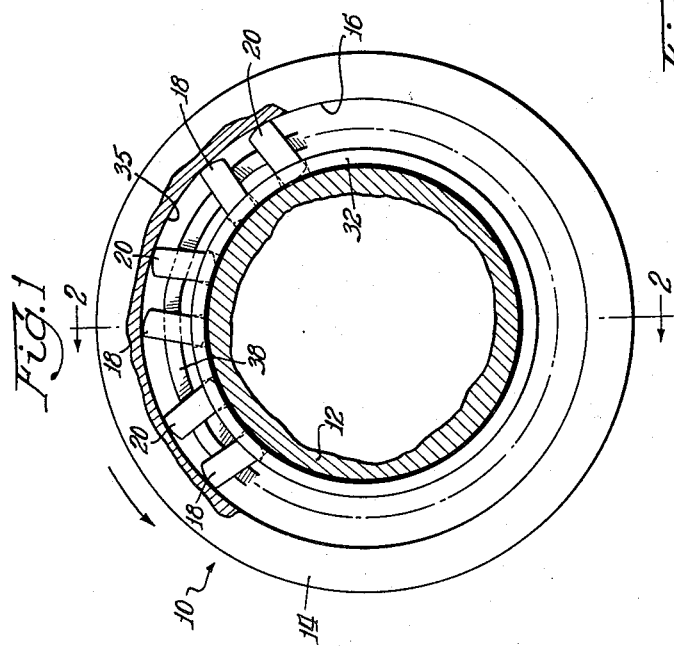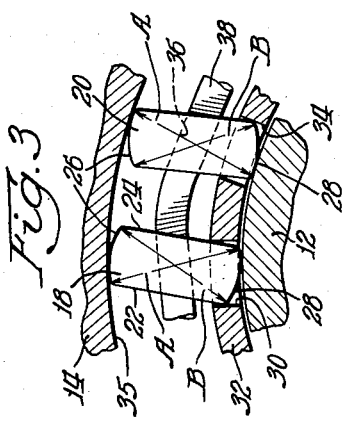

This invention relates to couplings, and more particularly to a coupling for securing concentric shafts each to the other for conjoint rotation.

This invention is primarily directed to a coupling for securing a male shaft to a female shaft. Heretofore, shafts of this type have been secured together by splines or keys. The forming of splines or keyways involves the use of milling machines which are costly to purchase and operate. Furthermore, the resulting joint or coupling is positive in action under all load conditions, and, in the event of inadvertent overload, costly damage often results.

A primary object of the invention is, therefore, to provide a coupling which exhibits all the advantages of the conventional spline or key coupling but which is relatively inexpensive to manufacture and install.

A further object of the invention is to provide a coupling of the stated type which may be constructed and arranged to yield at a predetermined torque level.

A further object of the invention is to provide a coupling for concentric shafts which is characterized by convenience in form and improved functional characteristics.

A more particular object of the invention is to provide a coupling of the mentioned character in which a plurality of grippers are arranged in the annular space between the shafts in a manner that relative rotation of the shafts in either direction is precluded.

Another object of the invention is to provide a coupling for concentric shafts in which a first series of tiltable grippers is arranged in the annular space between the shafts to preclude relative rotation of the shafts in one direction, in which an alternate series of tiltable grippers is arranged in the annular space between the shafts to preclude relative rotation in the shafts in the opposite direction and in which means are provided to maintain the grippers of the first series and the grippers of the second series in circumferentially spaced relation.

A further object of the invention is to provide a coupling in accordance with the preceding objects in which the grippers of the first series are provided with angularly extending openings, in which the grippers of the second series are provided with openings extending angularly oppositely with respect to the openings of the grippers of the first series, and in which an elongated annular coil spring passes through successive openings and biases the grippers of the first series in unison into engagement with the shafts while the grippers of the second series are biased out of engagement with the shafts and vice versa.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

FIGURE 1 is an elevational sectional view of a coupling made in accordance with the present invention shown in operative relation to a male shaft and a female shaft taken substantially on line 1—1 of FIGURE 2;

FIGURE 2 is a vertical sectional view taken substantially on line 2—2 of FIGURE 1;

FIGURE 3 is an enlarged fragmentary sectional view of the coupling of FIGURE 1; and FIGURE 4 is a fragmentary view similar to FIGURE 2 showing a modified form of the present invention.

Referring now to the drawings and more particularly to FIGURE 1, the coupling of the present invention is indicated generally by reference numeral 10 and is shown in operative relation to a male shaft 12 and a female shaft 14. Between the shafts 12 and 14 is an annular space 16 in which the coupling 10 resides. The inner periphery of the shaft 14 is illustrated as having a smooth bore 17 for a purpose that will be apparent. In the event that axial adjustment of the shaft 14 with respect to the shaft 12 is desired, the shaft 14 may be moved to the left or the shaft 12 to the right, as will be apparent. This adjustment may be made without interfering with the engaging relation of the coupling 10, as will be hereafter apparent.

The coupling 10 includes a plurality of tiltable grippers 18 arranged in a generally radial direction within the space 16 and an alternate series of tiltable grippers 20. Each of the grippers 18 has parallel side surfaces 22, 24 and oppositely directed cam surfaces 26, 28. The inner ends of the grippers 18 are shown as received in one of a plurality of axially extending circumferentially spaced slots 30 of a race 32. Between adjacent slots 30 are slots 34 for reception of the inner ends of the grippers 20. The present invention contemplates a coupling in which the need for the race 32 is eliminated and spacing accomplished by other means.

Referring now to FIGURE 3, each of the grippers 18 is provided with an angularly extending opening 36 through which passes an elongated annular coil spring 38. It will be noted that each of the grippers 20 is identical to the grippers 18 but is oppositely disposed so that the same reference numerals apply. The grippers 18 and 20 are shown as arranged in groups of one gripper 18 and one gripper 20 apiece. By this arrangement, the spring 38 assumes a tortuous path through the space 16 and movement of the grippers 18 into wedging position moves the grippers 20 out of interfering relation. It will be noted that the spring 38 tends to be distorted in the positions illustrated so that movement of one series of grippers, for a particular direction of rotation, out of wedging engagement with the peripheries of the shafts 12 and 14 is assured. The coupling 10 is shown in FIGURE 2 as fixed axially with respect to the shaft 12 by means of snap rings 31 and 33 received in suitable grooves.

It will be noted that the cam surfaces 26 and 28 of each gripper 18 are so formed that the hypotenuse A exceeds the hypotenuse B. As mentioned previously, each of the grippers 20 is identical to the grippers 18. It will be noted that the hypotenuse A of the grippers 20 is, in the neutral position of the coupling illustrated, disposed at a complementary angle to the hypotenuse A of each gripper 18, with respect to the radii of the shafts.

Assuming that the shaft 14 has a tendency to rotate in a counterclockwise direction with respect to the shaft 12, all of the grippers 18 are tilted about an axis substantially coincident with the intersection of the hypotenuses A and B so that each of the cam surfaces 26 is urged into wedging engagement with the inner periphery of the shaft 14 and each of the cam surfaces 28 is moved into wedging engagement with the outer periphery of the shaft 12. As this tilting movement occurs, the spring 38 tends to tilt each of the adjacent grippers 20 in the same direction so that the cam surfaces thereof are moved out of engagement with the shafts 12 and 14 and the corners defined by the hypotenuses A in light frictional engagement with the shafts.

In the event that the shaft 14 has a tendency to rotate in a clockwise direction, the cam surfaces of the grippers 20 are biased into engagement with the shafts 12 and 14 while the spring 38 forces the gripper 18 to assume an attitude in which only light frictional engagement is effected.

Referring now to FIGURE 4 a coupling 10a is illustrated in operative relation to a female shaft 14a provided with a stepped bore 17a having a shoulder 37. In this instance, the coupling 12a is provided with an outer race 32a fixed axially with respect to the shaft 14a by means of a snap ring 40. As in the form of the invention shown in FIGURE 2, the coupling 10a includes alternate series of oppositely faced grippers. In this form of the invention, however, the outer ends of the grippers are received in circumferentially spaced slots 30a in the race 32a. The grippers are shown in gripping relation to a hollow male shaft 12a which has a smooth outer periphery so that it may be moved to the right with respect to the shaft 14a, and so that the shaft 14a may be moved to the left with respect to the shaft 12a.

The coupling of the above-described invention exhibits important advantages over couplings for concentric shafts heretofore known. For instance, no machining operations are required on the outer periphery of the shaft 12 or on the inner periphery of the shaft 14. Relative movement between the shafts 12 and 14 is positively precluded by means of the present coupling. In addition, the grippers 18 and 20 may, if desired, be designed to yield at a predetermined torque to prevent damage to equipment. The shaft 12 may be adjusted axially with respect to the shaft 14, if desired, without interfering with the holding action of the grippers. The present coupling is efficient and effective under all operating conditions, including wet installations. The use of the instant coupling is not limited to connecting concentric shafts but may include sprockets, gears, pulleys, and wrenches as well. In this connection it will be noted that a sprocket may be made in two sections for use with a one-way clutch for a particular application and the same sections utilized with the present coupling to form a unitary sprocket. It is preferred that the length of each sprag should not be less than 1.1 of the sprag height. This relation should be maintained to eliminate any cocking or tipping action of the sprag when moved in a longitudinal direction with respect to the mating members. It will be noted that the longitudinal movement of the non-rotating sprag coupling is unlimited in its distance of travel. For instance, in the form of the invention shown in FIGURE 2 the shaft 12 may be moved for any desired distance at any desired speed into the bore of the shaft 14 and still maintain a driving relation if desired. The gripping action of the coupling in either direction is released the instant that the torque of the shafts is zero in either direction. The present coupling is capable of drivingly connecting mating members at any desired speed and, moreover, the mating members may be disposed in any desired position while engaged by the instant coupling. In other words, the mating members may be arranged in any desired position while the coupling is engaged for transmitting rotary motion and also while relative axial movement of the mating members is effected.

While I have described my invention in connection with certain specific constructions and arrangements, it is to be understood that this is by way of illustration and not by way of limitation and the scope of my invention is defined solely by the appended claims which should be construed as broadly as the prior art will permit.

I claim:

1. A coupling for concentric shafts comprising a ring of tiltable frictional coplanar grippers interposed between the shafts and adapted wedgingly to engage said shafts to preclude relative rotation therebetween, said ring including a first series of grippers arranged at a predetermined angle with respect to the radii of the shafts to preclude relative rotation of the shafts in one direction, a second series of grippers arranged at a predetermined opposite angle to preclude relative rotation of the shafts in the opposite direction, and means operable upon actuation to move said second series of grippers out of wedging relation when said shafts have a tendency relatively to rotate in said one direction and to move said first series of grippers out of wedging relation when said shafts have a tendency relatively to rotate in said opposite direction.

2. A coupling in accordance with claim 1 wherein the grippers of said second series are interposed between the grippers of said first series and wherein said means comprises an annular coil spring receivable in angularly oppositely extending openings in successive grippers.

3. A coupling in accordance with claim 2 wherein means are provided for maintaining said grippers in circumferentially spaced relation.

4. A coupling adapted releasably to secure a male shaft to a concentrically arranged female shaft for conjoint rotation and adapted to be affixed axially to one of said shafts comprising a ring of tiltable frictional coplanar grippers interposed between the shafts and adapted to connect said shafts to preclude relative rotation therebetween, said ring including a first series of grippers arranged at a predetermined angle to preclude relative rotation of the shafts in one direction, a second series of grippers arranged at a predetermined angle to preclude relative rotation of the shafts in the opposite direction, and means for securing said grippers in said predetermined angular positions.

5. A coupling for drivingly connecting a male shaft to a smooth bore female shaft at any desired point in the bore of the female shaft comprising a ring of tiltable frictional coplanar grippers interposed between the shafts and adapted to connect said shafts to preclude relative rotation therebetween, said ring including a first series of grippers arranged at a predetermined angle to preclude relative rotation of the shafts in one direction, a second series of grippers arranged at a predetermined angle to preclude relative rotation of the shafts in the opposite direction, and means for securing said grippers in said predetermined angular positions.

6. A coupling adapted to connect a female shaft to any desired point on the periphery of a radially spaced male shaft comprising a ring of tiltable frictional coplanar grippers interposed between the shafts and adapted to connect said shafts to preclude relative rotation therebetween, said ring including a first series of grippers arranged at a predetermined angle to preclude relative rotation of the shafts in one direction, a second series of grippers arranged at a predetermined angle to preclude relative rotation of the shafts in the opposite direction, and means for securing said grippers in said predetermined angular positions.

7. A coupling assembly for drivingly connecting a female shaft with a radially spaced male shaft including a coupling comprising a ring of tiltable frictional coplanar grippers interposed between the shafts and adapted to connect said shafts to preclude relative rotation therebetween, said ring including a first series of grippers arranged at a predetermined angle to preclude relative rotation of the shafts in one direction, a second series of grippers arranged at a predetermined angle to preclude relative rotation of the shafts in the opposite direction, means for securing said grippers in said predetermined angular positions, and means for retaining said coupling in a fixed axial position with respect to one of said shafts.

8. A coupling for concentric shafts comprising a ring of tiltable grippers adapted to frictionally engage the shafts interposed between the shafts, said ring of tiltable grippers comprising a first series of grippers arranged at a predetermined angle with respect to the shafts to preclude relative rotation of the shafts in one direction by wedgingly engaging therebetween, said ring of tiltable grippers further comprising a second series of tiltable grippers arranged at a predetermined angle with respect to the shafts to preclude relative rotation of the shafts in the opposite direction by wedgingly engaging therebetween, spring means in engagement with said tiltable grippers, and means on said grippers in engagement with said spring means effective to cooperate with said spring means in either direction of rotation effective to bias one of said series of grippers toward wedging engagement between the shafts and simultaneously to bias the other series of said grippers away from wedging engagement with the shafts.

9. The device defined in claim 8 in which there is further provided rigid means for spacing said grippers from each other.

References Cited in the file of this patent

UNITED STATES PATENTS

| | | |
|---|---|---|
| 362,767 | McNair | May 10, 1887 |
| 697,054 | Wiggins | Apr. 8, 1902 |
| 1,356,458 | Moody | Oct. 19, 1920 |
| 2,427,120 | Blair | Sept. 9, 1947 |
| 2,526,565 | Kennard | Oct. 17, 1950 |
| 2,570,290 | Turner | Oct. 9, 1951 |
| 2,743,803 | Ferris | May 1, 1956 |
| 2,797,109 | Conrad | June 25, 1957 |